United States Patent
Tang

(10) Patent No.: US 10,437,972 B2
(45) Date of Patent: Oct. 8, 2019

(54) IMAGE EXPOSURE METHOD FOR MOBILE TERMINAL BASED ON EYEPRINT RECOGNITION AND IMAGE EXPOSURE SYSTEM

(71) Applicant: JRD COMMUNICATION INC., Shenzhen (CN)

(72) Inventor: Xiangdong Tang, Shenzhen (CN)

(73) Assignee: JRD Communication Inc., Shenzhen (CN)

( * ) Notice: Subject to any disclaimer, the term of this patent is extended or adjusted under 35 U.S.C. 154(b) by 80 days.

(21) Appl. No.: 15/110,066

(22) PCT Filed: Dec. 8, 2015

(86) PCT No.: PCT/CN2015/096654
§ 371 (c)(1),
(2) Date: Jul. 6, 2016

(87) PCT Pub. No.: WO2016/176989
PCT Pub. Date: Nov. 10, 2016

(65) Prior Publication Data
US 2017/0150025 A1    May 25, 2017

(30) Foreign Application Priority Data
May 7, 2015  (CN) .......................... 2015 1 02286807

(51) Int. Cl.
*G06F 21/32*   (2013.01)
*G06K 9/00*    (2006.01)
(Continued)

(52) U.S. Cl.
CPC .............. *G06F 21/32* (2013.01); *G06F 21/31* (2013.01); *G06K 9/0061* (2013.01);
(Continued)

(58) Field of Classification Search
CPC .. H04L 63/0861; H04W 12/02; H04W 12/06; H04W 12/08; G06F 21/32; G06F 21/31;
(Continued)

(56) References Cited

U.S. PATENT DOCUMENTS 6,429,833 B1 *  8/2002  Ryeom ................. G09G 3/2037
                                                          345/60
8,533,815 B1 *  9/2013  Upson ................... H04L 9/3226
                                                          713/168
(Continued)

OTHER PUBLICATIONS

N. A. Schmid and F. Nicolo, "A method for selecting and ranking quality metrics for optimization of biometric recognition systems," 2009 IEEE Computer Society Conference on Computer Vision and Pattern Recognition Workshops, Miami, FL, 2009, pp. 126-133. (Year: 2009).*

(Continued)

*Primary Examiner* — Kari L Schmidt

(57) ABSTRACT

An image exposure method for a mobile terminal may be based on eyeprint recognition and an image exposure system, wherein the image exposure method may include acquiring image data through a camera when it is detected that the mobile terminal turns on the eyeprint recognition; positioning an eyeball at an eyeball position, and acquiring a brightness parameter of the eyeball position; and querying a prestored exposure parameter corresponding to the acquired brightness parameter, adjusting the exposure parameter, and exposing the eyeball at the eyeball position according to the adjusted exposure parameter.

11 Claims, 3 Drawing Sheets

(51) Int. Cl.
*H04W 12/08* (2009.01)
*H04W 12/06* (2009.01)
*G06F 21/31* (2013.01)
*H04L 29/06* (2006.01)
*H04N 5/232* (2006.01)
*H04N 5/235* (2006.01)
*H04N 5/243* (2006.01)

(52) U.S. Cl.
CPC ..... *G06K 9/00302* (2013.01); *G06K 9/00604* (2013.01); *G06K 9/00617* (2013.01); *H04L 63/0861* (2013.01); *H04N 5/2351* (2013.01); *H04N 5/2353* (2013.01); *H04N 5/23219* (2013.01); *H04N 5/23293* (2013.01); *H04N 5/243* (2013.01); *H04W 12/06* (2013.01); *H04W 12/08* (2013.01)

(58) Field of Classification Search
CPC .......... G06K 9/00302; G06K 9/00617; G06K 9/0061; G06K 9/00604; G06K 9/00597
See application file for complete search history.

(56) References Cited

U.S. PATENT DOCUMENTS

| | | | | |
|---|---|---|---|---|
| 9,773,169 | B1* | 9/2017 | Fulmer | G06K 9/00604 |
| 2004/0252867 | A1* | 12/2004 | Lan | G06K 9/0004 |
| | | | | 382/124 |
| 2005/0232506 | A1* | 10/2005 | Smith | G06T 5/50 |
| | | | | 382/254 |
| 2007/0002163 | A1* | 1/2007 | Madej | G06K 7/10 |
| | | | | 348/362 |
| 2012/0163678 | A1* | 6/2012 | Du | G06K 9/0061 |
| | | | | 382/117 |
| 2012/0320181 | A1* | 12/2012 | Hong | G06K 9/00281 |
| | | | | 348/78 |
| 2013/0063582 | A1* | 3/2013 | Choi | G06K 9/00617 |
| | | | | 348/78 |
| 2013/0182915 | A1* | 7/2013 | Hanna | A61B 5/117 |
| | | | | 382/116 |
| 2014/0033298 | A1* | 1/2014 | Park | G06F 21/32 |
| | | | | 726/17 |
| 2014/0112550 | A1* | 4/2014 | Hanna | G06K 9/00604 |
| | | | | 382/117 |
| 2015/0016692 | A1* | 1/2015 | Hanna | G06K 9/00604 |
| | | | | 382/117 |
| 2015/0071503 | A1* | 3/2015 | Prabhakar | G06K 9/0061 |
| | | | | 382/117 |
| 2015/0098630 | A1* | 4/2015 | Perna | G06K 9/00604 |
| | | | | 382/117 |
| 2015/0197205 | A1* | 7/2015 | Xiong | B60R 16/037 |
| | | | | 701/49 |
| 2015/0242608 | A1* | 8/2015 | Kim | G06F 1/3231 |
| | | | | 726/19 |
| 2015/0301724 | A1* | 10/2015 | Thibadeau, Sr. | G06F 3/04842 |
| | | | | 706/12 |
| 2016/0012291 | A1* | 1/2016 | Cleland | A61B 3/1233 |
| | | | | 382/117 |
| 2016/0019421 | A1* | 1/2016 | Feng | G06K 9/00604 |
| | | | | 382/117 |
| 2016/0125178 | A1* | 5/2016 | Danikhno | G06F 21/32 |
| | | | | 726/18 |
| 2016/0219434 | A1* | 7/2016 | Gren | G06F 21/32 |
| 2016/0283789 | A1* | 9/2016 | Slaby | G06K 9/00604 |
| 2016/0366588 | A1* | 12/2016 | Shi | G06F 21/32 |
| 2017/0091550 | A1* | 3/2017 | Feng | G06K 9/00617 |
| 2017/0109511 | A1* | 4/2017 | Dass | G06K 9/00926 |
| 2017/0193213 | A1* | 7/2017 | Tsou | G06F 21/32 |

OTHER PUBLICATIONS

S. P. Tankasala, P. Doynov, R. R. Derakhshani, A. Ross and S. Crihalmeanu, "Biometric recognition of conjunctival vasculature using GLCM features," 2011 International Conference on Image Information Processing, Shimla, 2011, pp. 1-6. (Year: 2011).*

Rezaei, Mandi, and Reinhard Klette. "Adaptive Haar-like classifier for eye status detection under non-ideal lighting conditions." Proceedings of the 27th Conference on Image and Vision Computing New Zealand. ACM, 2012. pp. 521-526. (Year: 2012).*

* cited by examiner

IMAGE EXPOSURE METHOD FOR MOBILE TERMINAL BASED ON EYEPRINT RECOGNITION AND IMAGE EXPOSURE SYSTEM

TECHNICAL FIELD

The present invention relates to the field of mobile terminal technologies, and more particularly, to an image exposure method for a mobile terminal based on eyeprint recognition and an image exposure system.

BACKGROUND

With the development of mobile communication and continuous improvement of living standards, use of various mobile terminals, such as mobile phones, is becoming increasingly popular, and mobile phones have become an indispensable means of communication in people's daily lives.

With the popularization of smart phones, many users utilize lock screen software to protect their privacy on their mobile phones, beautify their mobile phones, and reduce incorrect operation.

Eyeprint recognition lock screen software may be lock screen software for protecting privacy on users' mobile phones. Each person's eye texture may be different, and less likely to change greatly, in general. The eyeprint recognition lock screen software utilizes this principle to determine whether or not a user is an owner of the mobile phone by means of eyeprint analysis.

Use procedures of the eyeprint recognition lock screen software may be as below: in using for the first time, the user may input his/her own eyeprint information, which may be similar to face recognition lock screen software. Also an alternative unlock method may need to be inputted. This is because image recognition lock screen software may have a certain probability of failure in unlocking the screen. An alternative unlock method such as a password or nine-grid pattern may be preset so that the alternative unlock method is enabled once the eyeprint recognition is failed.

The principle of the eyeprint recognition lock screen software may be as below: a plurality of eye images of the user may be acquired by using a front-facing camera, then data processing can be performed on these images to acquire the user's eyeprint information, and the eyeprint information can be stored in the mobile phone locally. When the user unlocks the mobile phone, the eyeprint recognition software may turn on the front-facing camera to reacquire the user's eyeprint information, and then it can be determined whether or not the user is the owner of the mobile phone by comparing the eyeprint recognition with the prestored eyeprint information.

The eyeprint recognition lock screen software can utilize a front-facing camera to acquire eye image information of the user, and then process and analyze the image data. Therefore, requirements for image quality from the front-facing camera may be relatively higher.

However, different regions of the same image may have a problem of different exposure levels, resulting in the inability to obtain correct exposure configuration, the eye being too dark or too bright, poor image quality, lowered eyeprint recognition speed, and inconvenience of the user in unlocking.

Therefore, the prior art needs to be improved and developed.

SUMMARY

The technical problem to be solved by the present invention, aiming at the foregoing disadvantages of the prior art, may be to provide an image exposure method for a mobile terminal based on eyeprint recognition and an exposure system. It is intended to solve the disadvantages of failure of eyeprint recognition or slower eyeprint recognition speed due to underexposure or overexposure in the prior art, when eyeprint recognition is adopted in a user's mobile terminal.

In order to solve the technical problem, the present invention may adopt the following technical solutions.

There is provided an image exposure method for a mobile terminal based on eyeprint recognition, including:

A: detecting whether eyeprint recognition unlocking is started or not;

B: if the eyeprint recognition unlocking is started, turning on the camera to acquire a user's face image and display by preview the acquired face image on a display screen;

C: processing the face image by using eyeprint recognition software to position an eyeball at an eyeball position of the face image;

D: acquiring a brightness parameter of the eyeball position according to the eyeball position;

E: querying a prestored exposure parameter corresponding to the acquired brightness parameter, and adjusting the queried exposure parameter so that a brightness of an image exposed by using the adjusted exposure parameter is 128 gray-levels;

F: exposing an eyeball at the eyeball position according to the adjusted exposure parameter; and G: matching an eyeprint image acquired after exposure with prestored eyeprint data, and unlocking the mobile terminal if the matching succeeds, or prompting a failure in unlocking if the matching fails.

Further, in Step E, a specific method for adjusting the queried exposure parameter may include: increasing signal amplification factor and exposure time if the acquired brightness parameter is less than 128 gray-levels; and reducing the signal amplification factor and the exposure time if the acquired brightness parameter is greater than 128 gray-levels.

The present invention further provides an image exposure method for a mobile terminal based on eyeprint recognition, including:

A: acquiring image data through a camera when it is detected that the mobile terminal turns on the eyeprint recognition;

B: positioning an eyeball at an eyeball position, and acquiring a brightness parameter of the eyeball position;

C: querying a prestored exposure parameter corresponding to the acquired brightness parameter, adjusting the exposure parameter, and exposing the eyeball at the eyeball position according to the adjusted exposure parameter.

In the image exposure method for a mobile terminal based on eyeprint recognition, before the Step A, the method may further include:

S: acquiring in advance and storing a corresponding relation among a user's eyeprint data, the acquired brightness parameter and an exposure parameter.

In the image exposure method for a mobile terminal based on eyeprint recognition, after the Step C, the method may further include:

D: verifying an image acquired after exposure with prestored eyeprint data to unlock the mobile terminal.

Step C may include:

C1: querying a prestored exposure parameter corresponding to the acquired brightness parameter;

C2: decreasing or increasing exposure time and signal amplification factor according to a corresponding relation; and C3: exposing the eyeball at the eyeball position according to the adjusted exposure parameter.

In any one of the foregoing image exposure methods for a mobile terminal based on eyeprint recognition, the eyeball used during eyeprint recognition may be a left eye or/and a right eye.

The present invention may further provide an image exposure system for a mobile terminal based on eyeprint recognition, including:

a detecting and acquiring module, configured to acquire image data through a camera when it is detected that the mobile terminal turns on the eyeprint recognition;

a positioning module, configured to position an eyeball at an eyeball position, and acquire a brightness parameter of the eyeball position;

an adjusting and exposing module, configured to query a prestored exposure parameter corresponding to the acquired brightness parameter, adjust the exposure parameter, and expose the eyeball at the eyeball position according to the adjusted exposure parameter.

The image exposure system for a mobile terminal based on eyeprint recognition may further include:

a prestoring module, configured to acquire in advance and store a corresponding relation among a user's eyeprint data, the acquired brightness parameter and an exposure parameter.

The image exposure system for a mobile terminal based on eyeprint recognition may further include:

a verifying and unlocking module, configured to verify an image acquired after exposure with prestored eyeprint data to unlock the mobile terminal.

The adjusting and exposing module may include:

a querying unit, configured to query a prestored exposure parameter corresponding to the acquired brightness parameter;

an adjusting unit, configured to decrease or increase exposure time and signal amplification factor according to a corresponding relation; and an exposing module, configured to expose an eyeball at the eyeball position according to the adjusted exposure parameter.

In any one of the foregoing image exposure systems for a mobile terminal based on eyeprint recognition, the eyeball used during eyeprint recognition may be a left eye or/and a right eye.

The present invention may provide an image exposure method for a mobile terminal based on eyeprint recognition and an image exposure system, where the image exposure method may include: acquiring image data through a camera when it is detected that the mobile terminal turns on the eyeprint recognition; positioning an eyeball at an eyeball position, and acquiring a brightness parameter of the eyeball position; and querying a prestored exposure parameter corresponding to the acquired brightness parameter, adjusting the exposure parameter, and exposing an eyeball at the eyeball position according to the adjusted exposure parameter. According to the present invention, in the process of eyeprint recognition, a region exposure method can be used for a user's eyeball exposure to control the exposure, so that the eyeprint recognition speed is improved, the unlocking is safer and more convenient, and convenience is provided for the user.

DETAILED DESCRIPTION OF THE EMBODIMENTS

To make the objectives, technical solutions, and advantages of the present invention clearer, the following further describes in detail the present invention with reference to the accompanying drawings and embodiments. It is to be understood that the embodiments described herein are only intended to explain the present invention, and are not restrictive of the present invention.

Figure 1:
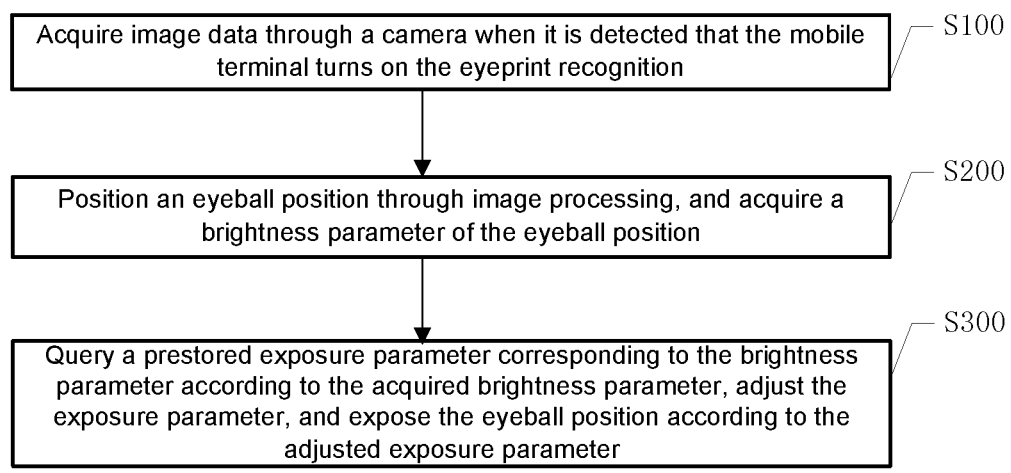
FIG. 1 is a flowchart of an image exposure method for a mobile terminal based on eyeprint recognition according to an embodiment of the present invention.

As shown in FIG. 1, the image exposure method for a mobile terminal based on eyeprint recognition according to a first embodiment of the present invention may include:

Step S100: Acquire image data through a camera when it is detected that the mobile terminal turns on the eyeprint recognition.

The mobile terminal may turn on the camera to acquire an image when the user starts the eyeprint recognition unlocking. Preferably, human face data can be acquired by the front-facing camera and data can be displayed by preview on a display screen of the mobile terminal.

Specifically, before the Step S100, the method may further include:

S1: Acquire in advance and store a corresponding relation among a user's eyeprint data, the acquired brightness parameter and an exposure parameter.

The user may set the method for unlocking the mobile terminal as the eyeprint recognition unlocking. Each human eye may have two eyeprints, respectively positioned at two sides of an iris. An eyeprint may reveal a great deal of human physiological information such as blood vessels or veins, etc. This seemingly irrelevant data may become precisely the important index for identifying the user. A smart mobile terminal may capture human eyeprint information.

When it is set as the eyeprint recognition unlocking terminal, the mobile terminal may capture the user's eyeprint data and store the captured eyeprint data for subsequent eyeprint recognition. Here, the user's eyeprint data may be directly acquired through the camera of the mobile terminal, or be acquired by using a camera and stored in the mobile terminal. Preferably, the user's eyeprint data can be directly acquired through the camera of the mobile terminal.

A corresponding relation between the acquired brightness parameter and the exposure parameter can be measured and obtained by many experiments. A Y value (namely, the brightness value) of an image in YUV Space can be defined as 128 (a threshold value). When the Y value in the image is greater than or smaller than 128, the exposure parameters including exposure time and gain (namely, signal amplification factor) can be adjusted so that the Y value is equal to 128.

A target brightness value can be about 18 degree gray (gray-level 128). If the brightness of an image does not reach this brightness value, gain (signal amplification factor) and exposure time can be increased so that the brightness of the image reaches this target value. Conversely, the gain and the exposure time may be decreased if the brightness of the image is greater than the brightness value. A specific signal amplification factor may be, for example, 1, 2 or 3. For example, it may be determined whether to increase or decrease the exposure time and whether to increase the signal amplification factor or not by means of the difference value between an existing brightness value and the target brightness value. For example, when the Y value (namely, gray-level) of the existing brightness is 12, the exposure time may be increased by 10 ms, and the signal amplification factor can be tripled. Specifically, adjustment of the exposure time and the signal amplification factor can be determined according to the needs.

Step S200: Position an eyeball at an eyeball position, and acquire a brightness parameter of the eyeball position.

When the camera is turned on, the mobile terminal may preview human face information. An eyeball may be positioned; there may be many methods for image processing in the prior art, which may not be described herein. After positioning the eyeball at the eyeball position by using an image processing method, the mobile terminal may also acquire the brightness parameter of the eyeball position.

Step S300: Query a prestored exposure parameter corresponding to the acquired brightness parameter, adjust the exposure parameter, and expose the eyeball at the eyeball position according to the adjusted exposure parameter.

The Zone System refers to dividing the tone or gray scale of a black-and-white picture into ten "zones": from the zero zone (the darkest part that can be manifested by a photo paper) to the tenth zone (the ground color of the photo paper-white). The fifth zone may be medium gray, which may be acquired by exposure from a reading of a light meter. The fifth zone may be a zone whose luminous reflectance is 18%.

A standard practice for acquiring correct exposure for the camera may be to calculate the mean value of Y values of the current image in YUV Space. It is may be that correct exposure is obtained after various exposure parameters settings are adjusted (automatically or manually) so that the mean value falls near a target value. In the present invention, 18% gray can be defined as a mean value. Generally, it may be that indoor or outdoor landscapes have an average luminous reflectance of about 18%. However, as previously mentioned, a color mean value may be regarded as a medium gray tone. Hence, by shooting a gray card having a luminous reflectance of 18%, the exposure parameters may be adjusted so that its color is close to medium-bright gray (the Y value is 128). Afterward, correct exposure may be automatically obtained for ordinary landscapes.

Therefore, after the brightness parameters of landscapes are acquired, exposure thereof may be adjusted close to medium-bright gray to obtain the best exposure effect. Step S300 may include:

S301: Query a prestored exposure parameter corresponding to the acquired brightness parameter;

S302: Decrease or increase exposure time and gain according to a corresponding relation; and S303: Expose the eyeball at the eyeball position according to the adjusted exposure parameter.

Because an image of blood vessels in the white part of the eyes is used for eyeprint recognition, the position of the eyes may be found according to an algorithm, and exposure is adjusted in reference to the white part of the eyes. Excessive exposure may lose eyeprint information. Low exposure may guarantee acquisition of clearer eyeprint information, and the recognition rate may be increased.

After the Step S300, the method may further include:

Step S400: Verify an image acquired after exposure with prestored eyeprint data to unlock the mobile terminal. Specifically, an eyeprint image acquired after exposure may be compared and verified with the prestored eyeprint data, the mobile terminal may be unlocked if the matching succeeds, or a failure in unlocking may be prompted if the matching fails.

The eyeball used during eyeprint recognition in the present invention may be a left eye or/and a right eye. In an embodiment, in a yin-yang face environment, exposure of the user's right and left eyes may be different. Therefore, exposure control may be focused on one eye to acquire a high-quality image of the eye, and eye recognition may be applied to the eye to accelerate the recognition speed. Also, eyeprint recognition may be applied to both right and left eyes. It may not specifically limit how many eyes are used for eyeprint recognition.

Figure 2:
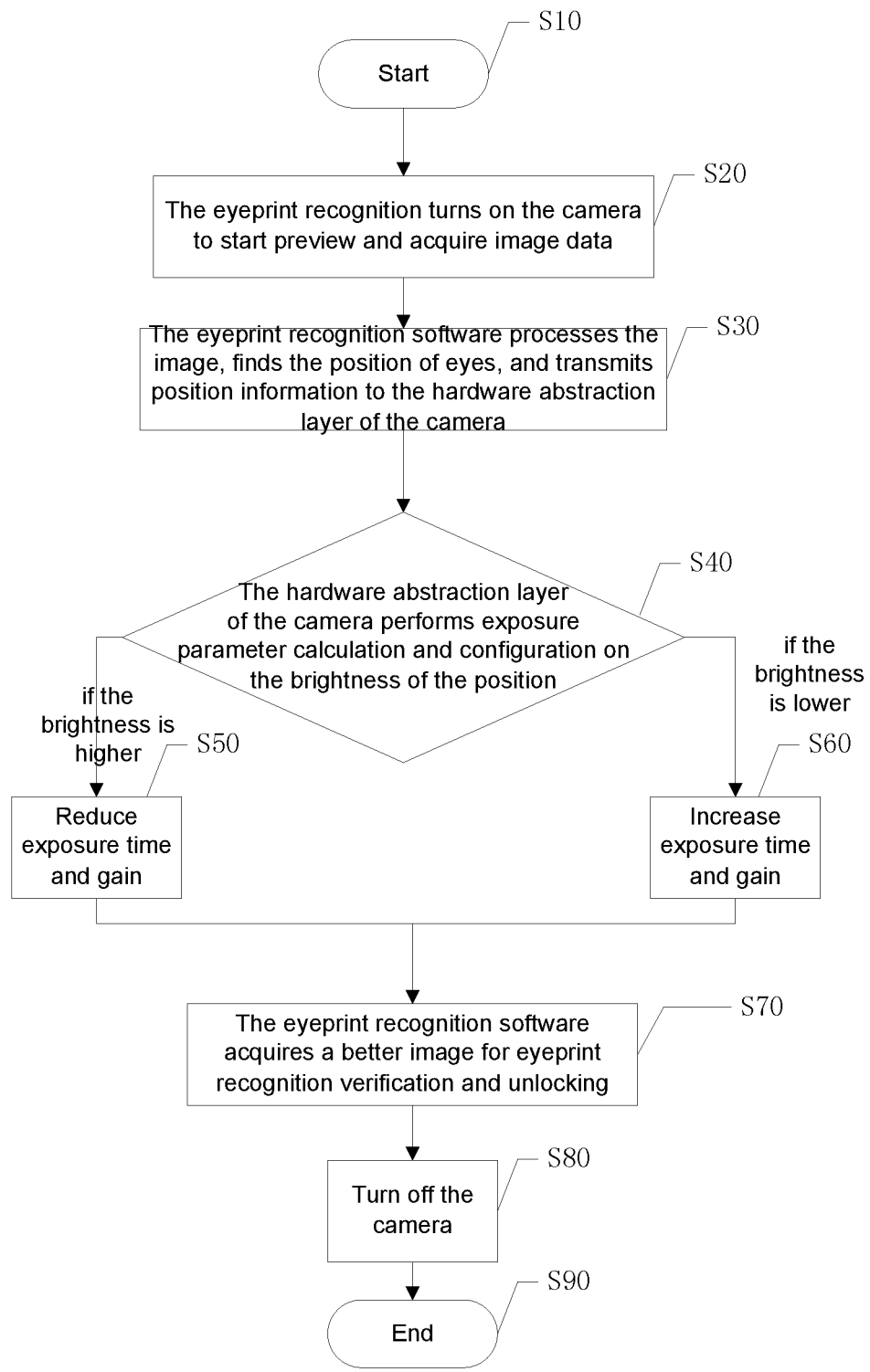
FIG. 2 is a flowchart of an image exposure method for a mobile terminal based on eyeprint recognition according to an embodiment of the present invention.

In an embodiment of an image exposure method for a mobile terminal based on eyeprint recognition according to the present invention, as shown in FIG. 2, the method may include following steps:

Step S10: Detect whether the mobile terminal starts the eyeprint recognition unlocking or not, then execute Step S20;

Step S20: The eyeprint recognition turns on the camera to start preview and acquire image data, then execute Step S30;

Step S30: the eyeprint recognition software processes the image, finds the position of eyes, and transmits position information to the hardware abstraction layer of the camera, then execute Step S40;

Step S40: the hardware abstraction layer of the camera performs exposure parameter calculation and configuration on the brightness of the position; execute Step S50 if the brightness is higher, or execute Step S60 if the brightness is lower; The brightness may be lower if a luminous reflectance of an object is less than 18%, and the brightness may be higher if the luminous reflectance of the object is greater than 18%.

Step S50: Reduce exposure time and gain, then execute Step S70;

Step S60: Increase the exposure time and the gain, then execute Step S70;

Step S70: The eyeprint recognition software may acquire a better image for eyeprint recognition verification and unlocking, then execute Step S80;

Step S80: Turn off the camera, then execute Step S90; and

Step S90: End eyeprint recognition.

As seen from the foregoing embodiments, the present invention provides an image exposure method for a mobile terminal based on eyeprint recognition, in the process of eyeprint recognition, an image of a human eyeball may be acquired by image processing, and the exposure parameters of the camera may be adjusted according to brightness data of the human eyeball position, and finally a high-quality eyeprint image may be obtained for recognition verification, thereby improving the speed of eyeprint recognition and bringing convenience for the user.

Figure 3:
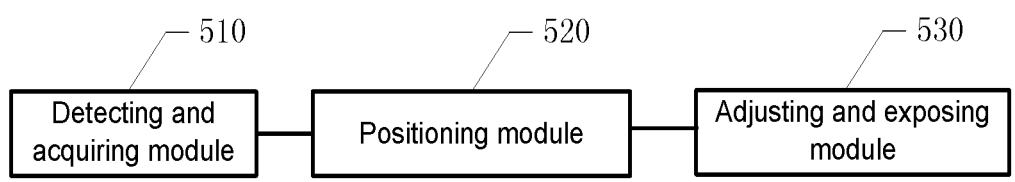
FIG. 3 is a functional block diagram of an image exposure system for a mobile terminal based on eyeprint recognition according to an embodiment of the present invention.

Based on the foregoing embodiments, the present invention may further provide a functional block diagram of an image exposure system for a mobile terminal based on eyeprint recognition according to an embodiment of the present invention, as shown in FIG. 3. The system may include[[s]]:

a detecting and acquiring module 510, configured to acquire image data through a camera when it is detected that the mobile terminal turns on the eyeprint recognition;

a positioning module 520, configured to position an eyeball at an eyeball position, and acquire a brightness parameter of the eyeball position; and an adjusting and exposing module 530, configured to query a prestored exposure parameter corresponding to the acquired brightness parameter, adjust the exposure parameter, and expose the eyeball at the eyeball position according to the adjusted exposure parameter.

The image exposure system for a mobile terminal based on eyeprint recognition may further include:

a prestoring module, configured to acquire in advance and store a corresponding relation among a user's eyeprint data, the acquired brightness parameter and an exposure parameter.

The image exposure system for a mobile terminal based on eyeprint recognition may further include:

a verifying and unlocking module, configured to verify an image acquired after exposure with prestored eyeprint data to unlock the mobile terminal.

In the image exposure system for a mobile terminal based on eyeprint recognition, the adjusting and exposing module may include:

a querying unit, configured to query a prestored exposure parameter corresponding to the acquired brightness parameter;

an adjusting unit, configured to decrease or increase exposure time and gain according to a corresponding relation; and an exposing module, configured to expose the eyeball at the eyeball position according to the adjusted exposure parameter.

In any one of the foregoing image exposure systems for a mobile terminal based on eyeprint recognition, the eyeball used during eyeprint recognition may be a left eye or/and a right eye.

The present invention may provide an image exposure method for a mobile terminal based on eyeprint recognition and an image exposure system, where the image exposure method may include: acquiring image data through a camera when it is detected that the mobile terminal turns on the eyeprint recognition; positioning an eyeball at an eyeball position, and acquiring a brightness parameter of the eyeball position; and querying a prestored exposure parameter corresponding to the acquired brightness parameter, adjusting the exposure parameter, and exposing the eyeball at the eyeball position according to the adjusted exposure parameter. According to the present invention, in the process of eyeprint recognition, a region exposure method can be used for a user's eyeball exposure to control the exposure, so that the eyeprint recognition speed may be improved, the unlocking may be safer and more convenient, and convenience can be provided for the user.

It is to be understood that application of the present invention is not limited to the foregoing examples, those of ordinary skill in the art may make improvements or transformations according to the foregoing description, and all these improvements and transformations should fall within the scope of protection of the appended claims of the present invention.

The invention claimed is:

1. An image exposure method for unlocking a mobile terminal based on eyeprint recognition, comprising:

acquiring and storing a corresponding relation among eyeprint data of a user, a brightness parameter and a prestored exposure parameter, wherein the eyeprint data comprises image data of blood vessels in white parts of eyes of the user;

detecting whether eyeprint recognition unlocking is started or not;

in response to the eyeprint recognition unlocking starting, turning on a camera the mobile terminal to acquire a color face image of the user, and displaying by preview the acquired color face image on a display screen of the mobile terminal, the color face image having a brightness component;

positioning at least a first eyeball displayed on the display screen at a first eyeball position, and acquiring a mean brightness parameter of the at least the first eyeball that includes a white part of the at least the first eyeball;

querying the prestored exposure parameter corresponding to the acquired mean brightness parameter to obtain an exposure parameter, if the mean brightness parameter is less than about 128 of a 0-255 brightness scale, adjusting the exposure parameter to obtain an adjusted exposure parameter by increasing an exposure time and a signal amplification factor (gain), and if the mean brightness parameter is greater than about 128 of the 0-255 brightness scale, adjusting the exposure parameter to obtain the adjusted exposure parameter by decreasing the exposure time and the signal amplification factor;

acquiring an eyeprint image of the at least the first eyeball according to the adjusted exposure parameter, the eyeprint image comprising image data of blood vessels in the white part of the at least the first eyeball; and matching the eyeprint image acquired after an exposure with stored eyeprint data, and unlocking the mobile terminal if the matching succeeds, or prompting a failure in the unlocking of the mobile terminal if the matching fails.

2. The method of claim 1, wherein an alternate password is activated in response to a failure of the system to unlock the mobile terminal with a first password.

3. The method of claim 1, wherein the eyeprint image is formed from white parts on two sides of an iris of an image of the at least the first eyeball and comprises image data of blood vessels in white parts on two sides of the iris of the at least the first eyeball.

4. An image exposure method for unlocking a mobile terminal based on eyeprint recognition, including:

acquiring facial image data of a user through a camera of the mobile terminal when it is detected that the mobile terminal turns on the eyeprint recognition;

positioning a first eyeball at a first eyeball position, and acquiring a brightness parameter for the white part of the first eyeball;

positioning a second eyeball at a second eyeball position, and acquiring a brightness parameter for the white part of the second eyeball;

querying a prestored exposure parameter corresponding to the acquired brightness parameters to obtain exposure parameters, adjusting the exposure parameters by adjusting an exposure time and a signal amplification factor (gain) such that a target brightness value equals to about 128 of a 0-255 brightness scale;

exposing the first eyeball at the first eyeball position with a first exposure to acquire an eyeprint of the first eyeball, and exposing the second eyeball at the second eyeball position with a second exposure to acquire an eyeprint of the second eyeball, according to the adjusted exposure parameters, wherein the first exposure is different from the second exposure, the eyeprint of the first eyeball comprises image data of blood vessels in the white part of the first eyeball, and the eyeprint of the second eyeball comprises image data of blood vessels in the white part of the second eyeball;

acquiring in advance and storing a corresponding relation among eyeprint data of the user, a brightness parameter and the adjusted prestored exposure parameter, wherein the eyeprint data comprises image data of blood vessels in white parts of eyes of the user; and verifying an image acquired after exposure with prestored eyeprint data to unlock the mobile terminal.

5. The image exposure method for unlocking a mobile terminal based on eyeprint recognition according to claim 4, including:

querying a prestored exposure parameter corresponding to the acquired brightness parameters;

decreasing or increasing exposure time and signal amplification factor according to a corresponding relation, thereby a target brightness value equals to about 128 of a 0-255 brightness scale to obtain an adjusted exposure parameter; and exposing the eyeball at the eyeball position according to the adjusted exposure parameter.

6. The image exposure method for unlocking a mobile terminal based on eyeprint recognition according to claim 4, wherein the exposed eyeball is a left eye or/and a right eye.

7. The method of claim 4, wherein an alternate nine-grid pattern is activated to unlock the camera in response to a failure of the system to unlock the mobile terminal with a first nine-grid pattern.

8. The method of claim 4, including determining whether to increase the exposure time and the signal amplification factor based on a difference between a value of the acquired brightness parameter and the target brightness value.

9. The method of claim 4, wherein the eyeprint image comprises image data of blood vessels in white parts on two sides of an iris of the first and second eyeballs.

10. An image exposure system for unlocking a mobile terminal based on eyeprint recognition, comprising:
a mobile terminal;
a camera;

wherein the mobile terminal is configured to acquire color image data of a user through the camera when it is detected that the mobile terminal turns on the eyeprint recognition;

wherein the mobile terminal is configured to position a first eyeball at a first eyeball position, and acquire a brightness parameter of the first eyeball, the brightness parameter including image data of a white part of the first eyeball;

wherein the mobile terminal is configured to query a prestored exposure parameter corresponding to the acquired brightness parameter of the eyeball position to obtain an exposure parameter, wherein the mobile terminal is configured to, by operation of a hardware abstraction layer, determine if the brightness parameter is greater or less than about an 18% luminous reflectance, wherein the mobile terminal is configured to
in response to the brightness parameter being greater than about an 18% luminous reflectance, adjust the exposure parameter by reducing an exposure time and a signal amplification factor (gain) to obtain an adjusted exposure parameter, and
in response to the brightness parameter being less than about an 18% luminous reflectance, adjust the exposure parameter by increasing the exposure time and the signal amplification factor to obtain an adjusted exposure parameter;

wherein the mobile terminal is configured to acquire an eyeprint of the first eyeball that includes the white part of the first eyeball, wherein the eyeprint of the first eyeball comprises image data of blood vessels from the white part of the first eyeball; and wherein the mobile terminal is configured to execute eyeprint recognition with the eyeprint of the first eyeball that includes the white part of the first eyeball;

wherein the mobile terminal is configured to acquire in advance and store a corresponding relation among eyeprint data of a the user, a the acquired brightness parameter of the an eyeball position and the prestored exposure parameter, wherein the eyeprint data of the user comprises image data of blood vessels of white parts of the eyeball of the user;

wherein the mobile terminal is configured to unlock the mobile terminal in response to results of the eyeprint recognition.

11. The system of claim 10, wherein the system activates an alternate password in response to a failure of the system to unlock the mobile terminal with the first password.

* * * * *